United States Patent [19]
Cannon et al.

[11] Patent Number: 5,170,490
[45] Date of Patent: Dec. 8, 1992

[54] RADIO FUNCTIONS DUE TO VOICE COMPRESSION

[75] Inventors: Gregory L. Cannon, Long Beach, Calif.; James M. O'Connor, N. Richland Hills; Kevin M. Laird, Haltom City, both of Tex.

[73] Assignee: Motorola, Inc., Schaumburg, Ill.

[21] Appl. No.: 589,360

[22] Filed: Sep. 28, 1990

[51] Int. Cl.$^5$ .................... H04B 1/00; H04B 7/00
[52] U.S. Cl. .................... 455/72; 455/84; 455/343; 370/76; 370/111; 381/31; 381/34; 381/35; 395/2
[58] Field of Search .................... 455/72, 84, 343; 370/109, 111, 76; 381/34, 35, 30, 31; 395/2

[56] References Cited

U.S. PATENT DOCUMENTS

| | | | |
|---|---|---|---|
| Re. 33,157 | 1/1990 | Heck | 455/166 |
| 4,271,499 | 6/1981 | Leveque | 455/72 |
| 4,608,712 | 8/1986 | Fedde | 455/166 |
| 4,665,514 | 5/1987 | Ching et al. | 370/109 |
| 4,754,450 | 6/1988 | Lynk, Jr. et al. | 370/29 |
| 4,843,612 | 6/1989 | Brusch et al. | 375/1 |
| 4,893,308 | 1/1990 | Wilson et al. | 370/109 |
| 4,912,705 | 3/1990 | Paneth et al. | 370/109 |
| 4,949,335 | 8/1990 | Moore | 370/29 |
| 5,058,202 | 10/1991 | Leveque | 455/72 |

Primary Examiner—Reinhard J. Eisenzopf
Assistant Examiner—Timothy H. Keough
Attorney, Agent, or Firm—Juliana Agon

[57] ABSTRACT

A method of voice communication is provided to avoid disruption in the received voice signal. A compressed voice signal is received occupying 100% of the audio time during a lesser percentage (352) of the radio frequency (RF) time (302). An informational signal is also received during at least a portion of a remainder (354) of the RF time. Scanning for another channel, receiving data or embedded control signals may occur during at least a portion of the remainder (354) of the RF time saved.

14 Claims, 2 Drawing Sheets

RADIO FUNCTIONS DUE TO VOICE COMPRESSION

BACKGROUND OF THE INVENTION

This invention relates to voice compression and more specifically, to improving radio functions using voice compression.

With the advance of voice coding techniques, a radio frequency (RF channel) can be more efficiently utilized. Voice coding algorithms allow speech information to be compressed for less RF time spent in transmission or reception of a voice signal. Moreover, subsequent decoding will expand the compressed voice signal to reproduce the original voice, which occupies 100% of the audio time. It is this percentage difference between the RF channel air time and the actual voice audio time that improves the efficiency of the RF channel.

One such usage is time-division multiplexing (TDM) where two or more channels of information are transmitted over the same link. However, there are numerous other applications that can utilize this percentage difference between the RF channel air time and the actual voice audio time to more efficiently implement different functions, features or radio operations in a single radio.

In scanning, it often is desirable to assign a priority to one or more of the channels (or frequencies) to be monitored and to receive the signal on the highest priority channel whenever a signal is being received on the priority channel. In a typical priority channel scanning system, the priority channel or channels are continually sampled, monitored, or scanned for signals during the reception of signals on any of the many non-priority or lower priority channels. Whenever a priority signal is detected, only the priority signal is received until the priority signal terminates.

The sample time or period is of sufficient length to detect the presence of a signal on the priority channel, but is short enough to prevent the production of a substantial audible hole in the signal being received on the non-priority channel. The priority sample periods are generally taken at fixed intervals. The sample periods do not cause a substantial audible signal hole in the non-priority signal, however, the signal is muted during the sample period which can cause both annoyance to the listener and some loss of signal intelligibility. Thus, when scanning for RF channel activity while receiving an RF channel of interest, received audio information is lost while the radio is checking other RF frequencies or priority channels. The signal being received must be interrupted during the time that the synthesizer is on another frequency so that the radio can determine whether or not there is channel activity on that new channel. To scan a radio system composed of several RF priority channels the original channel has to be interrupted many times a second with a corresponding loss in audio quality. Hence, if scan is active during a received transmission, information is lost and this information results in the degradation of audio quality.

As previously described, when a radio is unmuted, receiving a non-priority mode channel during scan, the user or subscriber is blind to other non-priority activity due to the limited hole size that can be punched. Only the priority channels are scanned while receiving. This means that even if important information exists for a particular radio on another non-priority channel, the radio cannot receive it. The user is therefore completely unaware that other information exists. Accordingly, it is desirable to provide an improved priority channel monitoring method and system which provides a minimal signal loss on the non-priority channels.

Conventionally, data and control or signalling information, is sent either before or after the user's voice transmissions. Otherwise, "holes" would have to be punched in the audio to receive the data transmission and control or signalling signals in the middle of the voice signal. Therefore, there is a need to send embedding signalling during a voice signal without losing audio quality during a voice signal and without muting the speaker during the data transmission or reception.

Reciprocally, there are numerous transmission applications that can utilize the percentage difference between the RF channel air time and the actual voice audio time to send signalling or control signals or mere data to control a radio or provide it with data. Conventionally, data is sent at the start or at the end of a voice transmission. Typically, data is sent only to the receiver of the entire transmission. In other words, a subscriber or user cannot direct data only to one subscriber and voice to another subscriber. Moreover, data transmission during a voice transmission is usually delayed until after the user has finished transmitting his or her voice signal. Hence, it is desirable to be able to direct data by sending signalling or control information to define the receiver of the voice signal, separately from the receiver of the data signal. Additionally, it is desirable to receive data, status, or timing information, etc. during the voice reception without losing audio quality.

SUMMARY OF THE INVENTION

Thus, a need arises to achieve minimal signal loss by sampling a priority channel during the time saved by compressing the speech in the received non-priority audio signal. In addition, one or more non-priority channels may also be scanned during this period due to the extra RF channel time gained from compressing the voice signal. In the same period gained from voice compression, instead of scanning, embedded signalling or data may be received during reception of the voice signal without audio degradation.

Accordingly, it is an object of the present invention to provide a radio with voice compression to utilize the extra RF time produced by voice compression for the operation of other functions such as scanning, transmission or reception of embedded signalling, transmission or reception of data, or battery life extension by deactivation of the receiver.

Briefly, according to the invention, a method of voice communication is provided to avoid disruption of the received voice signal. A compressed voice signal is received occupying 100% of the audio time but a lesser percentage of the radio frequency (RF) time. An informational signal is also received during at least a portion of the remainder of the RF time.

One aspect of the invention covers scanning for another channel during at least a portion of the remainder of the RF time.

Another aspect of the invention relates to receiving or transmitting data during the time saved.

A further aspect of the invention covers receiving or transmitting embedded control signals during the same time saved.

Another aspect of the invention covers transmitting data or embedded control signals on the same or another RF channel during the same time saved.

An additional aspect of the invention covers deactivating the radio receiver for extending battery life during the same time saved.

DESCRIPTION OF THE PREFERRED EMBODIMENT

Figure 1:
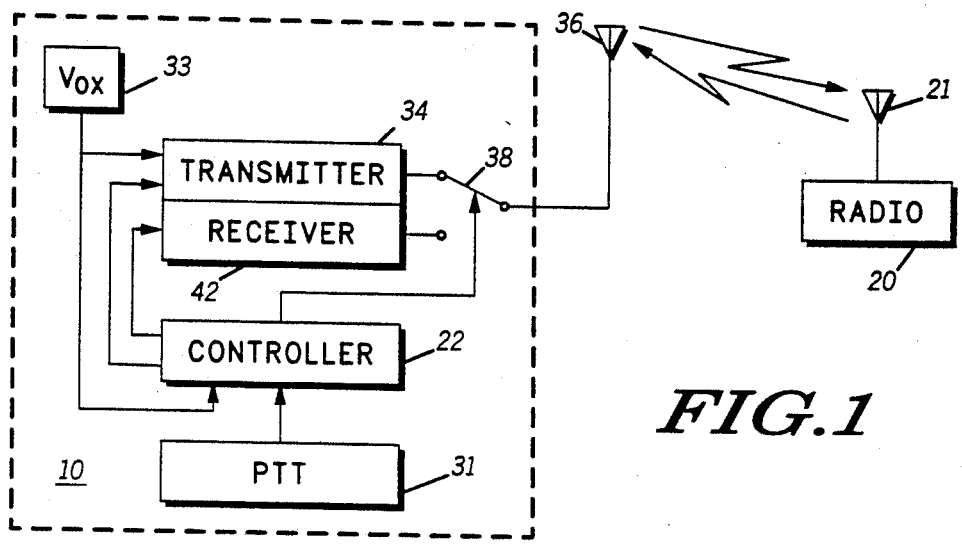
FIG. 1 is a block diagram of a communication system in accordance with the present invention.

Referring now by characters of reference to the drawings, and first to FIG. 1, a communication system utilizing voice compression techniques in accordance with the present invention is illustrated. Subscriber units may be mobile units, portable units, or control stations. Generally, a portable subscriber unit is designed to be carried on or about the person, a mobile subscriber unit is designed to be mounted into vehicles, and control stations are permanent or semi-permanent installations installed in buildings or other fixed locations. As used here, the term subscriber units collectively refers to portable units, mobile units or control stations. Basically, a two-way portable radio (or station) 10 includes a transmitter 34, a receiver 42, a controller 22, and an antenna switch 38. The transmitter 34 and receiver 42 are selectively connected to an antenna 36 via the switch 38. A manually operated Push-To-Talk (PTT) switch 31 coupled to one input of the controller 22, or a voice operated key 33 coupled to one input of the transmitter 34, selectively operates the controller 22. The radio 10 communicates with a second radio (or station) 20 having an antenna 21. The radio 20 may be identical to the radio 10 and may be connected to the antenna 21 as by an antenna switch operated by a controller. As will be further explained, the controller 22, may include a microcomputer or microprocessor, which controls the operation of the transmitter 34, the receiver 42, and the switch 38.

Figure 2:
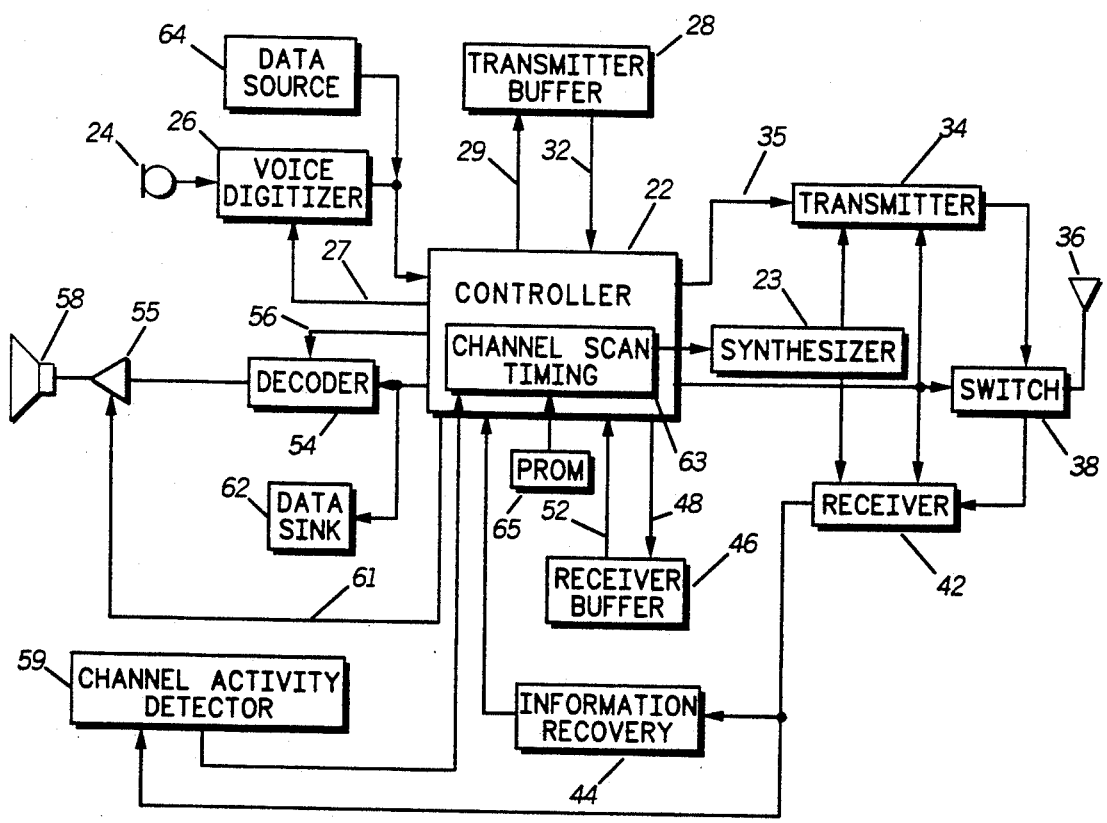
FIG. 2 is a block diagram of either radio of FIG. 1.

FIG. 2 illustrates a block diagram of the radio 10 (or 20) having a controller 22 to oversee total radio operation. Operationally, audio energy impressed upon a microphone 24 is digitized continuously at normal speed (speech information rate) by a voice digitizer 26, which is enabled by the controller 22 via a connection 27. The voice digitizer is activated by a voice operated relay (VOX) located within the voice digitizer 26 or by activation of the Push-To-Talk switch 31. When voice is present, the voice digitizer 26 encodes according to a vocoding scheme such as Vector-Sum-Excited Linear Predictive (VSELP) coding, sub-band coding (SBC) or another scheme. The controller 22 feeds the digitized voice signal into a transmitter buffer 28 via a data line 29.

Figure 3:
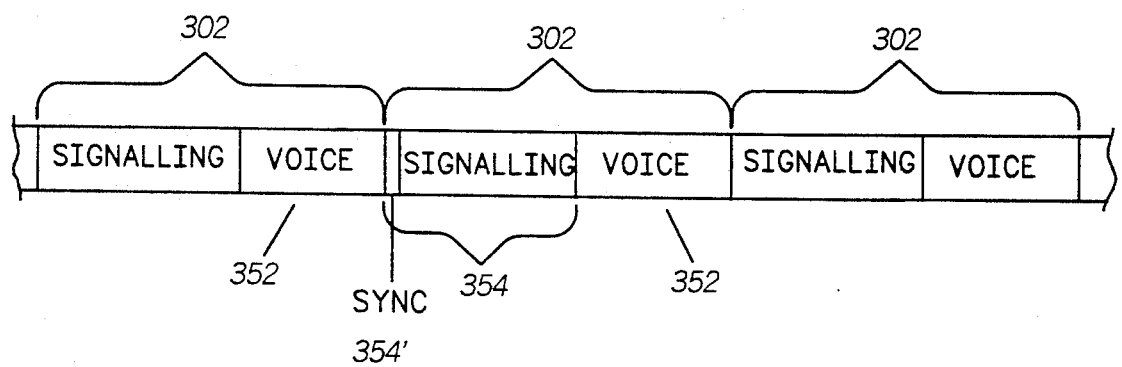
FIG. 3 is a protocol in accordance with the present invention.

Referring to FIGS. 2 and 3, to achieve time compression suitable to more efficiently use the RF communication channel, the duration and timing of the frames 302 are divided into voice 352 and signalling 354 fields or subframes as can be defined in accordance with any suitable voice-compressed protocol. During a voice transmit field 352 of a frame 302, speech information is retrieved from the transmitter buffer 28 by the controller 22 (via a connection 32) and transmitted at a selected rate exceeding that at which it was stored (channel transmission rate or channel bit rate). For example, if the speech information rate was 9600 BPS, a channel transmission rate of 12,000 BPS would allow for four fifths of a frame to be split between voice transmission or reception and one fifth for scanning, sync data transmission or reception of any other signalling data. The retrieved voice information is routed to a transmitter 34 via a connection 35. During a signalling transmit field 354 of a frame 302, the controller 22 may couple a preamble signal which constitutes a predetermined control signal or other signalling data to the transmitter 34, also via the connection 35.

The controller 22 couples the transmitter 34 to an antenna 36 via a switch 38. Alternatively, the switch 38 could be replaced with a duplexer (or the like) to continually couple the transmitter and receiver to the antenna. These elements may be of conventional construction as commonly used in the radio arts. Data information (already in digital form) may be transmitted in the same manner via data source 64 during the signalling subframe 354.

At the listener end, speech information would be written into the receiver buffer at the transmission rate during the receive frame and read from the buffer continuously to provide input to the speech decoder which in turn would provide normal speed voice to the speaker circuits.

To receive information from the RF channel, the controller 22 couples the antenna 36 to a receiver 42 via a switch 38. The controller 22 also controls a synthesizer 23 which determines the frequency of operation of the transmitter 34 and the receiver 42. The receiver 42 is coupled to an information recovery means 44. The information recovery block 44 is any means that will perform receive data clock recovery after synchronizing to the receive signal and recover the transmitted information. The recovered information is passed to the controller 22. Voice information received during one or more voice subframes 352 is coupled into a receiver buffer 46 by the controller 22 via a connection 48. Data information received during one or more of the signalling fields 354 is coupled into a data sink 62 by the controller 22. The data sink may be a printer or monitor device which accepts the data and displays it for the operator. Embedded control information received during one or more of the signalling fields 354 is consumed by the controller 22 for use in radio control.

The contents of the receiver buffer 46 are applied by the controller 22 to a decoder 54 via a connection 52. The decoder 54 is enabled by the controller 22 via a connection 56. The decoder 54 decodes the received voice information according to the vocoding scheme that was used by the transmitting radio, producing speech digitized at the normal speed (speech information rate). The decoder 54 also provides a means of converting the digitized speech samples into an analog voice signal. The analog voice signal is applied through an audio amplifier 55 to a loudspeaker 58, for sound reproduction. The controller 22 utilizes the embedded control information to determine when an appropriate voice call is being received and generates a control signal (61) to render operative the audio amplifier 55 for reproduction of the voice audio by the loudspeaker 58.

The receiver 42 is also coupled to a channel activity detector 59. The channel activity detector 59 is of a conventional type which detects the presence of an RF signal on the channel and produces a control signal in response which is coupled to a channel scan timing and control logic 63. The channel scan timing and control logic in the preferred embodiment is comprised of one of the functions of the microprocessor used as the controller 22 which is programmed to provide the control signals necessary to sequentially scan the radio frequency channels. The channel scan timing and control logic 63 is coupled to the synthesizer 23 as shown to control the synthesizer in the conventional manner so as to tune the radio to predetermined channels in sequential order. The channel scanning sequence can be modified inside the controller 22. Also coupled to the channel scan timing and control logic 63 is a programmable read-only memory (PROM) 65 within which are stored the predetermined priority channels. Hence, the channel scan timing and control logic 63 implemented utilizing a microcomputer or microprocessor provides a conventional channel scan with priority such as are widely used in the communications field. The present invention relates to when the scan occurs.

Scanning without audio loss is one radio function that may be implemented during the time available in signalling subframe 354 due to voice compression. Multifrequency receivers generally have an automatic switching, monitoring, or scanning system for selecting tuning elements or a synthesized channel to provide for signal reception on any one of a plurality of different channels. The receiver 42 is switched (23) sequentially through each channel and locks on to a channel when a carrier is detected on that channel. The receiver then terminates the channel scanning or selecting until the signal terminates. At this point, the channel scanning resumes. If a non-priority channel is being received, the receiver periodically samples a priority channel during reception of signals on the non-priority channel and locks onto the priority channel whenever a carrier is detected during the sampling interval.

Typically, in a priority signal scanning system, the length of time that each channel is sampled when no signals are detected should be relatively short to permit the rapid scanning of all the channels for a received signal. The sampling interval is conventionally maintained short enough to prevent interfering with the reception on the non-priority channel. Due to voice compression, the present invention achieves no audio loss by sampling the priority channel during the time saved or gained from compressing the voice signal.

Referring to FIG. 3, one possible packetized embedded signalling scheme in accordance with the present invention is shown. A radio frequency communication channel formatted into repeated frames 302, each apportioned into repeated subframes 354 and 352, can transmit both voice and signalling information on a single channel due to voice compression. In this type of information transmission, a packet or frame 302 is composed of voice subpackets or subframes 352 and "signalling" subpackets or subframes 354 that contain fields of information which is, for example, allocated to signalling, voice system management, or encryption. The embedded signalling 354 provides a variety of functions. It may provide, at the beginning, a word SYNC 354', to allow receivers to figure out where the start of the frame is. It may also provide call type information such as a private call, a group call, a voice-only call or a voice and data call. Other system management, status information, or message information may also be included in the signalling subframe 354. Therefore, for convenience, the subframe 354 is labeled "signalling" only, but during this "signalling" period, scanning for a priority or non-priority channel may occur. In addition, if not scanning, the same "signalling" subframe 354 can accommodate plain data from a data source to a data sink as well as embedded signalling.

The usage of signalling may be illustrated with the example of initiating a voice transmission. When voice transmission is desired, the PTT button 31 is manually (or voice (33)) activated by a talker or subscriber on the calling radio 10, and the ID of the listener's radio 20 to be called along with synchronization information or other signalling data to be used by the called unit 20 for frame synchronization, may be transmitted in the signalling field 354. When synchronization has been achieved by the called unit 20 and the called unit 20 detects its ID, the called unit 20 sends a control signal burst designated as SYNC in signalling field 354. Detection of SYNC by the calling unit 10 in signalling field 354 signals the start of voice conversation between the talker 10 and the listener 20 in a subsequent voice subframe 352. The talker then transmits and the listener receives voice during the voice fields 352, while signalling or scanning operations occur in signalling subframe 354 without degradation of voice quality.

The digital nature of the message implies that the bits are coming in at a standard rate and that both the transmitting and receiving radios know that rate. The receiver will also know the format of the incoming information with particular knowledge of the location of voice data within this packet. This timing knowledge along with the control structure to decide whether or not to disregard the embedded signal will control the radio's operation.

Each of these fields has digital information with the voice field composed of bits that are the output of the voice coding algorithm. The voice coding algorithm allows the speech information to be compressed so that voice decoding will reproduce the original voice. This means that the information in a voice field will take 100% of audio time but a lesser percentage of RF time. It is the percentage difference between the RF channel air time and the actual voice audio time that this invention is based upon. For example, the VSELP algorithm can process speech in 30 mS segments at a time. Each 30 mS of analog audio becomes a VSELP or voice subframe of digital bits which takes 22 mS of airtime. In this particular implementation, it is this ability to send 30 mS of voice in 22 milliseconds of airtime that allows embedded signalling to be sent concurrently with voice.

This embedded signalling scheme coupled with the voice coding algorithm is desirable because at times the signalling information in the signalling subframe 354 can be lost without any loss in audio quality. The subscriber or user can stop listening (the receiver can be powered down) to the RF channel and still receive all of the voice information since it has been compressed in the voice subframes 352. In many cases, all of the signalling information in subframe 354 is not needed. During these times in signalling subframes 354, the radio is receiving information that it does not need for audio reconstruction. The signalling information can then be sacrificed without loss of audio quality. Hence, the receiver can be periodically powered down during the reception of a voice signal, in order to extend the battery life of the radio.

It is during these times in the signalling subframe 354 that the radio can automatically change the synthesizer frequency to determine whether or not there is channel activity on another channel. If there is, then the radio will begin to receive a message on a new channel. If the new channel is a priority channel, the receipt of the original message will be permanently halted. If there is no channel activity, then the synthesizer will return to the original frequency in time to receive all of the voice information in the subsequent voice subframe 352.

Due to the technology of voice compression, holes can therefore be punched in the embedding signalling that can be much longer than they currently are by merely interrupting the audio. Thus, non-priority channels can be sampled or scanned just as the priority channels are sampled as previously described in the signalling subframe 354. If another non-priority channel has been detected with channel activity, then the user or operator could be alerted via a call-waiting alert tone sounded by the loudspeaker 58 that another non-priority channel has information on that channel.

Of course, if multiple other non-priority channels had activity on them, then the radio could present a menu of options to which channel the user would like to receive. The user then has the capability of remaining on his current channel. Additionally, he could be given the capability to turn off call-waiting temporarily.

Thus, if the channel scanned is a non-priority channel, the user would be alerted and presented with an option to remain on his current channel or switch to another non-priority channel. If there is no channel activity, the synthesizer would similarly return to the original frequency in time to receive all of the voice information in the subsequent voice subframe 352. If the other channel scanned is another non-priority channel, and the user decides to select the other channel to receive on, then the old channel (which still has activity on it) shall not alert the user to its presence but new non-priority channels will be provided. At any time, the user may attempt to return to the original non-priority channel using the user interface. If unsuccessful, the radio will return to receive on the other non-priority channel again. At all times, priority sampling will continue such that any activity on a priority channel will pre-empt any non-priority channel's activity.

If not scanning, the time saved during the signalling subframe 354 may accommodate data transmission and reception. As described, since the compressed voice coded signal does not require equivalent audio time to send the signal in voice subframes 352, time can be stolen to send data subpackets to any subscriber at many times during voice transmission in signalling subframes 354. If the receiver of the data happens to be the receiver of the voice also, as directed by signalling or control information in one signalling subframe 354, that receiver can receive the data during a subsequent signalling subframe 354 without having to perform muting of the speaker during reception of the data.

A subscriber using radio 10 may set up a call using the packetized transmission scheme as illustrated in FIG. 3. During the signalling subframe 354 of the signalling, radio 10 can transmit data packets to any other subscriber, by changing the synthesizer 23, transmitting the data packet and then changing the synthesizer back again to the original channel to continue receiving the voice in the next voice subframe 352. The original channel can remain active with the use of some of the signalling in signalling subframe 354 to tell the receiver of the voice, radio 20, to bring up a carrier on his channel.

If the receiver of the data is also the receiver of the voice, then the signalling control information in one signalling subframe 354 can inform the receiver of the time of transmission. Then, the receiver will stop receiving signalling information and receive data packets in a subsequent signalling subframe 354. This data can be modulated differently than the voice or signalling and still be transmitted and received in signalling subframe 354 to support backwards protocol compatibility. Hence, the data in signalling subframe 354 may be modulated by a different method than the voice signal in voice subframe 352. Accordingly, if the transmitter is just sending idle signalling or control information, then the receiver may transmit data to another subscriber and then return to receive all of the voice in time during a subsequent voice subframe 352.

The present invention therefore provides an improved system and method of monitoring one or more priority or non-priority channels and receiving or transmitting data or signalling information with no disruption in a received signal. Because the priority or non-priority channel or channels and data or signalling information are received during the time not used in the reception of the compressed voice signal, the channel monitoring time or reception of data or signalling can be increased to receive more information without degrading the audio quality (or without losing audio information). Also provided is the capability to power down the receiver periodically during the reception of a compressed voice signal, in order to extend the battery life of the radio.

While a preferred embodiment of the invention has been described and shown, it should be understood that the frame 302 can be varied and modified into other formats or protocols to utilize the time saved from voice compression for the insertion of embedding data or signalling information, or scanning during the voice transmission and reception.

We claim as our invention:

1. A method of voice communication on a radio channel having a frame arranged into a voice subframe and a signalling subframe, the method comprising the steps of:

receiving a compressed voice signal during said voice subframe;

receiving an informational signal during said signalling subframe without audio degradation of a radio receiving said signals; and determining whether to disregard a portion of said information signal for performing an operation of said radio instead of receiving said portion of said information signal during at least said portion of said signalling subframe, wherein said performing of said operation step comprises scanning for a signal on another frequency during at least said portion of said signalling subframe.

2. The method of claim 1 wherein said receiving of said compressed voice signal step comprises receiving on said channel said compressed voice signal during a fraction of a radio frequency (RF) transmission air time to provide a continuously audible voice signal.

3. The method of claim 1 wherein said performing of said operation step comprises scanning for another compressed voice signal on another frequency during at least said portion of said signalling subframe.

4. The method of claim 1 wherein said receiving of said informational signal step comprises receiving signalling data.

5. The method of claim 1 wherein said receiving of said informational signal step comprises receiving synchronization signals.

6. A method of monitoring one or more radio channels operable in a timing frame arranged into voice subframes and signalling subframes, the method comprising the steps of:
   receiving a voice-compressed signal on a first channel during a voice subframe;
   receiving signalling data upon the termination of said received voice-compressed signal during a signalling subframe; and
   sampling another channel for a sampling period for another signal during at least a portion of another signalling subframe without audio disruption in said received voice-compressed signal.

7. The method of claim 6 further comprising the step of:
   signalling an operator when said another signal is detected on a second channel, while continuing audio reproduction of said voice-compressed signal.

8. A method of communication on a radio channel arranged into voice and signalling subframes, the method comprising:
   receiving a carrier wave modulated in a first manner by signalling data during a signalling subframe;
   receiving said carrier wave modulated in said first manner by a voice-compressed signal during a voice subframe; and
   receiving said carrier wave modulated in a second manner by an informational signal during at least a portion of another signalling subframe without audio disruption in audio reproduction of said received voice signal.

9. The method of claim 8 wherein said first modulation manner is a different method of modulation than said first manner.

10. The method of claim 8 further comprising the step of determining whether to a portion of said informational signal.

11. The method of claim 10 further comprises transmitting said carrier wave modulated in said second manner by data during at least said portion of said signalling subframe without audio disruption in audio reproduction of said received voice signal in response to disregarding said portion of said informational signal.

12. A method of voice communication on a radio channel having a frame arranged into a voice subframe and a signalling subframe, the method comprising the steps of:
   receiving a compressed voice signal on a first frequency during said voice subframe; and
   transmitting an informational signal on a second frequency during at least a portion of said signalling subframe without audio degradation at said first frequency.

13. A method of voice communication on a radio channel having a frame arranged into a voice subframe and a signalling subframe, the method comprising the steps of: in a radio:
   receiving in a receiver a compressed voice signal during a voice subframe;
   saving voice information from said received compressed voice signal in a receive buffer;
   receiving synchronization data during a signalling subframe;
   retrieving voice information from said receive buffer for reproducing sound of said received voice signal during said voice subframe and said signalling subframe;
   determining whether to disregard at least a portion of said synchronization data; and
   powering down said receiver during at least said portion of said signalling subframe to extend battery life of said radio without audio degradation in sound reproduction of said received voice signal from said retrieved voice information.

14. A method of voice communication on a radio channel having a frame arranged into a voice subframe and a signalling subframe, the method comprising the steps of:
   transmitting to a first receiver on a first frequency a compressed voice signal during said voice subframe; and
   transmitting to a second receiver on a second frequency an informational signal during at least a portion of said signalling subframe without audio degradation at said first receiver.

* * * * *